Patented July 4, 1939

2,164,357

UNITED STATES PATENT OFFICE 2,164,357

ESTERS OF HETEROCYCLIC MONOCARBOXYLIC ACIDS

Harold R. Slagh, Midland, Mich., assignor to The Dow Chemical Company, Midland, Mich., a corporation of Michigan No Drawing. Application October 15, 1938, Serial No. 235,243

3 Claims. (Cl. 260—338)

This invention concerns unsaturated heterocyclic organic acid esters of 1,4-dioxanediol-2,3 and particularly the furoic and coumarin-carboxylic acid esters.

These new compounds may be prepared by reacting 2,3-dichloro-dioxane-1,4 with furoic acid or coumarin-carboxylic acid. While the acid and dichloro-dioxane can be reacted together in any suitable proportions, from about 0.5 to about 2.25 molecular equivalents of acid are preferably employed for each mole of dichloro-dioxane. A mixture of di-esters of 1,4-dioxanediol-1,3 and mono-esters of 1,4-dioxaneol-2-chloro-3 is generally obtained, the di-ester being formed in increasing proportion as the ratio of acid to dichloro-dioxane in the reaction mixture increases. In carrying out the reaction, the acid and dichloro-dioxane are mixed together and warmed to a temperature at which hydrogen chloride is evolved from the mixture. Following completion of the reaction, the reacted mixture is treated to recover the desired ester products in any suitable manner, e. g. by distillation, fractional crystallization, etc.

The preferred reaction temperature varies with the particular acid employed, but is generally between about 100° C. and the decomposition temperature of the reaction mixture, although somewhat lower temperatures may be employed. While not essential, it is preferable that the reactants be dissolved in an inert solvent such as benzene, chlorobenzene, toluene, xylene, etc., and the reaction carried out by heating the mixture at its refluxing temperature. The time required for carrying out the reaction is dependent upon the reaction temperature and particular acid employed.

The products obtained in the above reaction are crystalline substances of definite melting point, having a slight tendency to decompose upon distillation, and to polymerize upon exposure to air and light. These compounds are useful as plasticizers and modifying agents.

The following examples describe the preparation of the furoic and coumarin-carboxylic acid esters.

Example 1

112 grams (1 mol) of furoic acid, 79 grams (0.5 mol) of 2,3-dichloro-dioxane-1,4, and 100 milliliters of xylene were mixed together and heated to the reflux temperature of 140°–144° C. for 13 hours. Distillation of the reacted mixture resulted in the recovery of the xylene and unreacted portions of the furoic acid and dichloro-dioxane, and in the isolation of 59 grams of a difuroate of 1,4-dioxanediol-2.3 fraction boiling at 174°–183° C. at 0.25 inch pressure. Upon recrystallization from ethyl alcohol this fraction yielded white crystals melting at 73° C. and having a pleasant ester odor.

Example 2

79 grams (0.5 mol) of 2,3-dichloro-dioxane-1.4, 190 grams (1 mol) of coumarin-carboxylic acid having the formula

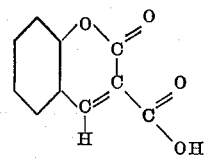

and 100 milliliters of xylene were refluxed together at 146°–154° C. for 11.5 hours, at the end of which time no further hydrogen chloride was given off by the mixture. The reaction product was cooled, filtered, and the residue washed with xylene and ether. This residue, consisting of 147 grams of the crude di-ester product, was very insoluble in most organic solvents and melted at 239°–243° C. A small amount of this product was recrystallized from epichlorohydrin to obtain the di-(coumarin-carboxylate) of 1,4-dioxanediol-2,3 as fine, tan colored crystals having a sweetish ester odor, and melting at 255° C.

The above described esters have been found of value as modifying agents in the preparation of insoluble styrene polymers. In a representative procedure a 5 per cent by weight solution of the di-furoate of 1,4-dioxanediol-2,3 in monomeric styrene was subjected to polymerizing conditions by immersion in an oil bath at 120° C. for 21 hours. The resulting hard, clear resin product was found not perceptibly soluble in such solvents as benzene, carbon tetrachloride, and chloroform. Styrene polymerized in a similar manner without the addition of the difuroate and in combination with the corresponding di-acetate compound yielded products freely soluble in the above solvents.

This application is a continuation-in-part of a co-pending application Serial No. 161,470, filed August 28, 1937.

Other modes of preparing the compounds set forth in the foregoing examples may be employed instead of those explained, change being made as regards the method, reactants, and proportions thereof disclosed provided the compounds stated by any of the following claims or the equivalent of such compounds be obtained.

I therefore particularly point out and distinctly claim as my invention:

1. A compound selected from the group consisting of the di-furoate of 1,4-dioxanediol-2,3 and the di-(coumarin-carboxylate) of 1,4-dioxanediol-2,3.

2. The difuroate of 1,4-dioxanediol-2,3.

3. The di-(coumarin-carboxylate) of 1,4-dioxanediol-2,3.

HAROLD R. SLAGH.